United States Patent Office 3,354,696
Patented Nov. 28, 1967

3,354,696
PNEUMATIC DETECTOR OF CHROMATO-
GRAPHIC FRACTIONS
Josef Novák and Jaroslav Janák, Brno, Czechoslovakia,
assignors to Československá akademie věd, Prague,
Czechoslovakia
Filed Jan. 31, 1964, Ser. No. 341,587
Claims priority, application Czechoslovakia,
Feb. 14, 1963, 863/63
3 Claims. (Cl. 73—23.1)

ABSTRACT OF THE DISCLOSURE

A pneumatic detector of chromatographic fractions measuring dynamic effects of gas flow through a pneumatic resistor in which a carrier gas is fed into a pneumatic bridge arrangement including two in parallel connected pairs of in series connected pneumatic resistors, in which the same carrier gas is passed through a chromatographic column, the output of which is connected between a pair of pneumatic resistors of the bridge, and wherein a pressure responsive means is connected across the bridge between the pairs of pneumatic resistors.

---

Figure 1:
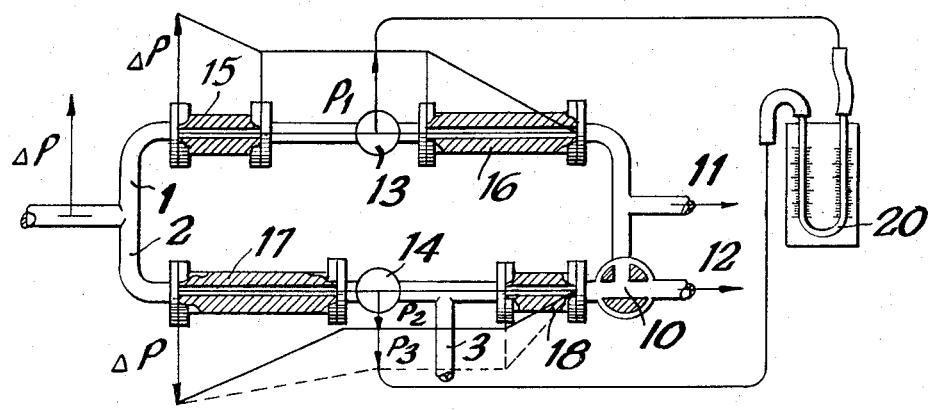

The present invention concerns a pneumatic detector of chromatographic fractions measuring dynamic effects of gas flow through the pneumatic resistor.

At present, for the detection of gaseous chromatographic fractions the following detectors are mostly used: Catharometers and ionization detectors, further detectors based on heat effects of combustion reactions or working on the basis of thermocouple cooling resulting from gas flow, the last being effected by changes of its density. Some of these detectors are highly sensitive, however, for their functioning relatively complicated electrometric devices are needed and therefore, they are considerably expensive. Besides, they require feeding from an electric supply; this causes certain difficulties when portable devices for field application are used. An experiment was done using a pneumatic detector which measured directly the changes of the pressure drop on the pneumatic resistor (Griffits J. H., James D. H., Phillips C.S.G.: Analyst 77 (1952) 897). This detector, however, has not been used on a broader scale because of the following disadvantages. The pressure drop caused by the analysed component is measured as a relatively low value against the value of basic pressure drop, caused by the flowing carrier gas, and the integral record of the response is not possible. Chromatographic fractions passing through the sensing element fill up dead spaces of the measuring device and their washing out is made difficult by diffusion, which results in an distortion of the chromatograms. The pneumatic detector as described in the present invention practically removes all the drawbacks mentioned above.

The present invention relates to a pneumatic detector of chromatographic fractions which comprises four pneumatic resistors in a series-parallel bridge connection, the bridge being fed with a stream of pure carrier gas. Two input resistors function as hard flow supplies and are placed before two further resistors, one of them being a reference resistor and the other an indicative one. The response is taken by means of valves connected in series before the reference and the indicative resistors. The reference resistor is fed only with the stream of pure carrier gas from the resistor preconnected in series. The indicative resistor is fed with the stream of carrier gas from the respective series resistor, as well as with the carrier gas stream from the chromatographic column, this stream being connected behind the joint of the response measuring device according to the direction of the gas flow. The value of the indicative resistor is chosen as many times smaller than the value of the reference resistor, as many times higher is the sum of the carrier gas streams from the chromatographic column and from the respective series resistor than the gas flow through the reference resistor. As pneumatic resistors either capillaries corresponding to the changes of gas viscosity or screens corresponding to the changes of gas density (molecular weight) can be used.

At this arrangement of the pneumatic detector of chromatographic fractions the following advantages are obtained: on increasing the bridge resistance and the pressure at its input, the sensivity of the detector rises at a constant zero response to the basic signal of the carrier gas. The measuring device for pressure differences is in contact with pure carrier gas only, so that there is no danger of diffusion of chromatographic fractions into the dead spaces. When using an integral flow-meter, integral data can be obtained directly. No electric devices are needed for measuring, the detector can be designed in miniature dimensions and can be easily thermostated.

Figure 2:
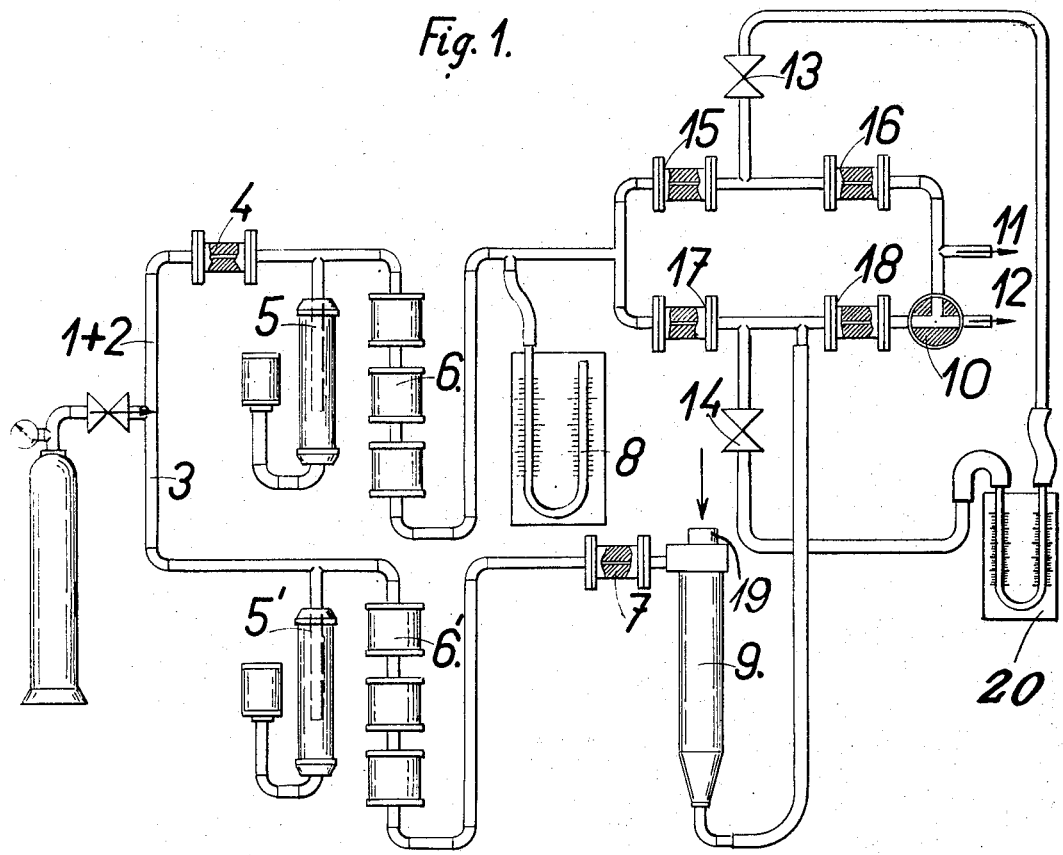

In FIGURE 1 a scheme of the arrangement of the proper detector with the illustration of the course of pressures in pneumatic resistors is shown. FIGURE 2 shows the series connection of the pneumatic detector into the chromatographic system.

The carrier gas stream passing directly from the valve of the pressure bottle is divided into two streams, one of which 1+2 feeds the detector circuit, the other 3 supplies the circuit with the chromatographic column. The flow ratio of both streams is (1+2)/3, i.e. the ratio necessary for zero setting of the detector can be adjusted independently by means of three elements, i.e. using the pneumatic resistor 4 and the manostats 5 and 5'. The elements 6 and 6' are the dampers of pressure oscillations. The pneumatic resistor 7 functions as a hard flow supply, rejecting in this manner the impact effect of the flow, when sampling into the chromatographic column. Its values has to be higher than the sum of the values of the other resistors in the rest of the circuit. Further elements of the circuit are the manometer 8 for measuring the pressure $\Delta P$ at the input of the bridge, the chromatographic column 9, and a convenient flowmeter which is alternatively connected at a suitable position of the valve 10 in points 11 and 12. From both data, i.e. from streams 1+2 and 1+2+3 the flow 3 through the chromatographic column can be determined. The pneumatic resistors 15 and 17 function as hard supplies of flow 1 and 2. The resistor 16 is a reference resistor and the resistor 18 is an indicative one. The sample is injected into the chromatographic column in point 19. If the chromatographic fraction does not pass through the detector, the sum of the pressures $p_2+p_3$ between the resistors 17 and 18 equals the pressure $p_1$ between the resistors 15 and 16. The response is measured as pressure difference $\Delta p$ by means of the valves 13 and 14 and a pressure responsive means 20 connected thereto either differentially or integrally.

Among the pressure difference $\Delta p$, the input pressure $\Delta P$, the values of the individual pneumatic resistors and the carrier gas flow through the column the following relation is valid:

$$\Delta p = p_2 + p_3 - p_1 = \frac{\Delta P w_{18}}{w_{17}+w_{18}} + \frac{v_3 w_{17} w_{18}}{w_{17}+w_{18}} - \frac{\Delta P w_{16}}{w_{15}+w_{16}} \quad (1)$$

where $w$ is the pneumatic resistor, $v_3$ the flow of carrier gas through the chromatographic column.

By differentiating $\Delta p$ with respect to $w_{18}$ we obtain $$d\Delta p = \frac{\Delta P w_{17} + v_3 w_{17}^2}{(w_{17}+w_{18})^2} dw_{18} \quad (2)$$

For the change of the pressure difference $d\Delta p$ in dependence on the values of the individual detector elements, on physical properties and on the concentration $x$ of the substance being analysed in the carrier gas can be written.

$$d\Delta p = \frac{\Delta P w_{17} + v_3 w_{17}^2}{(w_{17} + w_{18})^2} w_{18} \frac{\theta_x - \theta_o}{\theta_o} dx \qquad (3)$$

This relation shows the detector sensitivity. The factor characterising the specific response is given by the relative difference $(\theta_x - \theta_o)/\theta_o$, where $\theta_x$ represents the density or viscosity of the pure substance being analysed and $\theta_o$ the carrier gas density or viscosity. If a screen is used as pneumatic resistor, the changes of density are measured, however, if a capillary is used, viscosity is measured. Because, in most cases, the relative difference of densities is higher than the relative difference of viscosities and because density (especially with gases where it is proportional to the molecular weight) is easier to be determined than viscosity, the use of a screen as a sensing element is commonly of greater advantage.

The detector sensitivity is shown by the following example: Pneumatic resistances $w_{16} = w_{17} = 100$ mm. Hg. sec. ml.$^{-1}$; resistors $w_{15} = w_{18} = 50$ mm. Hg. sec. ml.$^{-1}$; $\Delta p = 100$ mm. Hg; hydrogen used as carrier gas (the density corresponds to the molecular weight=2, viscosity=$0.88.10^{-4}$ poise at 25° C.) passing through the column at the velocity of $v_3 = 1$ ml. sec.$^{-1}$; gas being analysed: oxygen (the density corresponds to the molecular weight 32, viscosity=$1.9.10^{-4}$ poise at 25° C.). Then according to the relation (3) the concentration of oxygen in hydrogen necessary for causing the pressure difference $\Delta p = 1$ mm $H_2O$, in case when the pneumatic resistor is a capillary, is 0.13 vol. percent, in case of a screen it is 0.010 vol. percent. If the means true value of the noise response is 1 mm. $H_2O$, then at the ratio response/noise=2 represented in units $S$[ml./s.] (McWilliam I. G.: J. Appl. Chem. 9 (1959) 379) for the capillary $S = 2.66.10^{-3}$ ml. sec.$^{-1}$ and for the screen $S = 2.05.10^{-4}$ ml. sec.$^{-1}$.

The detector related in this invention is especially suitable for plant laboratories, for geological survey and other laboratories as a portable device not requiring electric supplies, further for the technical inspection service in plants, mines, etc.

We claim:

1. A pneumatic detector of chromatographic fractions from a chromatographic column by measuring dynamic effects of gas flow through a pneumatic resistor, comprising, a conduit connected to a source of the same carrier gas that is used in the chromatographic column; a first line connecting a first and second pneumatic resistor in series between said conduit and a region downstream of said second pneumatic resistor; a second line connecting a third and fourth pneumatic resistor in series between said first conduit and said region; a second conduit connecting the output of the chromatographic column to said second line between said third and fourth resistors; a pressure responsive means connected to said first line between said first and second resistors and said second line between said third resistor and said second conduit.

2. A pneumatic detector as defined in claim 1, wherein said pressure responsive means is in the form of a differential measuring device.

3. A pneumatic detector as defined in claim 1, wherein said pressure responsive means is in the form of an integral measuring device.

References Cited

UNITED STATES PATENTS

| | | | |
|---|---|---|---|
| 1,884,896 | 10/1932 | Smith | 73—23 |
| 1,922,939 | 8/1933 | Fagelston | 73—23 |
| 2,263,335 | 11/1941 | Heinz | 73—23 |
| 2,310,435 | 2/1943 | Jenkins | 73—23 XR |
| 3,086,386 | 4/1963 | Kapff | 73—23 |
| 3,135,108 | 6/1964 | Santeler | 73—23.1 |

JAMES J. GILL, *Primary Examiner.*